United States Patent
Zhang et al.

(10) Patent No.: US 7,210,303 B2
(45) Date of Patent: May 1, 2007

(54) TRANSCRITICAL HEAT PUMP WATER HEATING SYSTEM USING AUXILIARY ELECTRIC HEATER

(75) Inventors: Lili Zhang, East Hartford, CT (US); Yu Chen, East Hartford, CT (US)

(73) Assignee: Carrier Corporation, Syracuse, NY (US)

( * ) Notice: Subject to any disclaimer, the term of this patent is extended or adjusted under 35 U.S.C. 154(b) by 360 days.

(21) Appl. No.: 10/728,292

(22) Filed: Dec. 4, 2003

(65) Prior Publication Data

US 2005/0120729 A1   Jun. 9, 2005

(51) Int. Cl.
*F25B 39/04* (2006.01)
*F25B 27/00* (2006.01)

(52) U.S. Cl. ........................... 62/183; 62/238.6
(58) Field of Classification Search ............... 62/238.6, 62/238.7, 159, 160, 324.1, 324.5, 275, 151, 62/150, 156, DIG. 17; 165/240, 242; 237/2 B, 237/8 A
See application file for complete search history.

(56) References Cited

U.S. PATENT DOCUMENTS

| | | | | |
|---|---|---|---|---|
| 2,836,965 A | * | 6/1958 | Kleist | .................... 62/DIG. 17 |
| 4,112,705 A | * | 9/1978 | Sisk et al. | .................. 62/238.6 |
| 4,143,707 A | * | 3/1979 | Lewis et al. | .................. 62/160 |
| 5,305,822 A | * | 4/1994 | Kogetsu et al. | ............. 165/240 |

FOREIGN PATENT DOCUMENTS

JP     2002250575 A  *  9/2002

* cited by examiner

*Primary Examiner*—Chen Wen Jiang
(74) *Attorney, Agent, or Firm*—Carlson, Gaskey & Olds

(57) ABSTRACT

Refrigerant is circulated through a vapor compression system including a compressor, a gas cooler, an expansion device, and an evaporator. An auxiliary electric heater is activated to further heat the heated water exiting the gas cooler when the heating capacity of the system is low. The auxiliary electric heater can be located on the water line exiting the gas cooler, in a water tank that stores the heated water, or on the refrigerant line proximate to the compressor discharge.

14 Claims, 2 Drawing Sheets

TRANSCRITICAL HEAT PUMP WATER HEATING SYSTEM USING AUXILIARY ELECTRIC HEATER

BACKGROUND OF THE INVENTION

The present invention relates generally to a transcritical vapor compression system including an auxiliary electric heater that further heats the water that exchanges heat with the refrigerant in the gas cooler.

Chlorine containing refrigerants have been phased out in most of the world due to their ozone destroying potential. Hydrofluoro carbons (HFCs) have been used as replacement refrigerants, but these refrigerants still have high global warming potential.

"Natural" refrigerants, such as carbon dioxide and propane, have been proposed as replacement fluids. Carbon dioxide can be used as a refrigerant in automotive air conditioning systems and other heating and cooling applications. Carbon dioxide has a low critical point, which causes most air conditioning systems utilizing carbon dioxide as a refrigerant to run transcritically, or partially above the critical point, under most conditions.

A vapor compression system usually operates under a wide range of operating conditions. When the outdoor air temperature varies, the temperature of the refrigerant exiting the evaporator varies. Therefore, the heating capacity of the vapor compression system in the summer is generally four to five times greater than the heating capacity of the vapor compression system in the winter, and the refrigerant mass flow rate of the vapor compression system in the summer is generally eight to ten times greater than the refrigerant mass flow rate of the vapor compression system in the winter. Although the heating capacity of the system changes as the operating conditions change, the required heating load of the system does not change as the operating conditions change.

A vapor compression system must be able to provide enough heating capacity to meet the load requirements during the winter when the outdoor air temperature is the lowest. In the prior art, the vapor compression system is oversized to provide enough heating capacity in the winter. However, oversizing the vapor compression system causes the heating capacity to be higher than necessary for most of the ambient conditions, significantly increasing cost.

Hence, there is a need in the art for a vapor compression system that has a high heating capacity and is cost effective. This invention includes an auxiliary electric heater that further heats the water that exchanges heat with the refrigerant in the gas cooler.

SUMMARY OF THE INVENTION

The present invention provides a vapor compression system that includes an auxiliary electric heater that further heats the water that exchanges heat with the refrigerant in the gas cooler.

Refrigerant circulates through a vapor compression system. In one example, carbon dioxide is used as the refrigerant. As carbon dioxide has a low critical point, systems utilizing carbon dioxide as the refrigerant usually run transcritically. The refrigerant is compressed in a compressor and then cooled in a gas cooler. The refrigerant rejects heat to water flowing through the gas cooler, and the water exits the gas cooler in a heated state. The refrigerant is then expanded to a low pressure in an expansion device. After expansion, the refrigerant flows through an evaporator and is heated by outdoor air. The refrigerant then reenters the compressor, completing the cycle.

The system further includes an auxiliary electric heater that further heats the heated water exiting the gas cooler. The auxiliary electric heater is activated to further heat the water exiting the gas cooler when the heating capacity of the vapor compression system does not meet the demand.

In one example, the auxiliary electric heater is positioned on the water line exiting the gas cooler. If the water pump is a single speed water pump, the auxiliary electric heater is activated when a temperature sensor on the water line exiting the heat sink outlet or supply detects the temperature of the water exiting the heat sink outlet or supply is below a threshold value. Alternately, the auxiliary electric heater is activated when an ambient temperature sensor detects the temperature of the outdoor air is below a threshold value.

The auxiliary electric heater can also be positioned in a water tank that stores the heated water or on the refrigerant line proximate to the compressor discharge.

The auxiliary electric heater can also be located on the refrigerant line proximate to the compressor discharge. In this example, the auxiliary electric heater can also decrease the time of the defrost cycle. When the surface temperature of the evaporator is below the dew-point temperature of the moist outdoor air, water droplets condense onto and freeze on the evaporator fins. A defrost cycle is initiated to defrost the evaporator. When a defrost sensor detects a condition that necessitates defrosting, the control turns on the auxiliary electric heater to heat the refrigerant exiting the compressor discharge and reduce the time of the defrost cycle.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
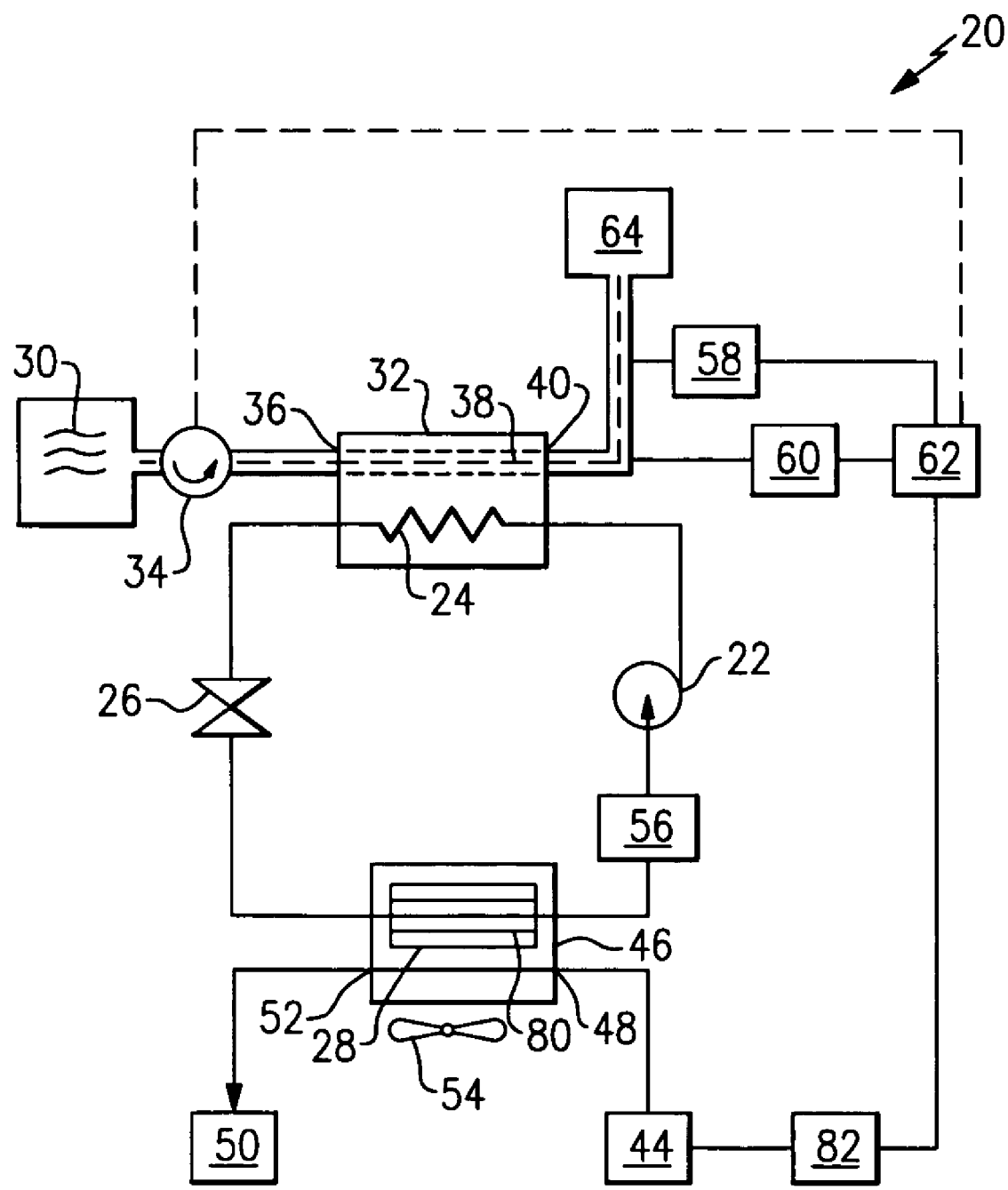
FIG. 1 schematically illustrates a diagram of a first embodiment of a vapor compression system employing an auxiliary electric heater.

FIG. 1 illustrates an example vapor compression system 20 that includes a compressor 22, a heat rejecting heat exchanger (a gas cooler in transcritical cycles) 24, an expansion device 26, and a heat accepting heat exchanger (an evaporator) 28. Refrigerant circulates through the closed circuit system 20.

The refrigerant exits the compressor 22 at a high pressure and a high enthalpy. The refrigerant then flows through the gas cooler 24 at a high pressure. A fluid medium 30, such as water or air, flows through a heat sink 32 of the gas cooler 24 and exchanges heat with the refrigerant flowing through the gas cooler 24. In the gas cooler 24, the refrigerant rejects heat into the fluid medium 30, and the refrigerant exits the gas cooler 24 at a low enthalpy and a high pressure. A water pump 34 pumps the fluid medium through the heat sink 32. The cooled fluid medium 30 enters the heat sink 32 at the heat sink inlet or return 36 and flows in a direction opposite to the direction of the flow of the refrigerant. After exchanging heat with the refrigerant, the heated water 38 exits the heat sink 30 at the heat sink outlet or supply 40. The heated water can be stored in a water tank 64. In one example, the water tank 64 is sized to meet expected peak demand at all times.

The refrigerant then passes through the expansion valve 26, which expands and reduces the pressure of the refrigerant. The expansion device 26 can be an electronic expansion valve (EXV) or other known type of expansion device.

After expansion, the refrigerant flows through the passages 80 of the evaporator 28 and exits at a high enthalpy and a low pressure. In the evaporator 28, the refrigerant absorbs heat from the outdoor air 44, heating the refrigerant. The outdoor air 44 flows through a heat sink 46 and exchanges heat with the refrigerant passing through the evaporator 28 in a known manner. The outdoor air 44 enters the heat sink 46 through the heat sink inlet or return 48 and flows in a direction opposite to or cross to the direction of flow of the refrigerant. After exchanging heat with the refrigerant, the cooled outdoor air 50 exits the heat sink 46 through the heat sink outlet or supply 52. The temperature difference between the outdoor air 44 and the refrigerant in the evaporator 28 drives the thermal energy transfer from the outdoor air 44 to the refrigerant as the refrigerant flows through the evaporator 28. A fan 54 moves the outdoor air 44 across the evaporator 28, maintaining the temperature difference and evaporating the refrigerant. The refrigerant then reenters the compressor 22, completing the cycle.

The system 20 transfers heat from the low temperature energy reservoir (ambient air) to the high temperature energy sink (heated hot water). The transfer of energy is also achieved with the aid of electrical energy input at the compressor 22.

The system 20 can also include an accumulator 56. The accumulator 56 stores excess refrigerant from the system 20 to control the high pressure of the system 20, and therefore the coefficient of performance.

In one example, carbon dioxide is used as the refrigerant. Although carbon dioxide is described, other refrigerants may be used. Because carbon dioxide has a low critical point, systems utilizing carbon dioxide as a refrigerant usually run transcritically.

The heating capacity of a vapor compression system 20 is defined as the capacity of the system 20 to heat the water 30 that flows through the gas cooler 24 and accepts heat from the refrigerant in the gas cooler 24. A vapor compression system 20 usually operates under a wide range of operating conditions. For example, the temperature of the outdoor air 44 can vary between −10° F. in the winter and 120° F. in the summer, which causes the temperature of the refrigerant exiting the evaporator 28 to vary between approximately −20° F. and 90° F. Therefore, the heating capacity of the vapor compression system 20 in the summer is generally four to five times greater than the heating capacity of the vapor compression system 20 in the winter, and the refrigerant mass flow rate of the vapor compression system 20 in the summer is generally eight to ten times greater than the refrigerant mass flow rate of the vapor compression system 20 in the winter. Although the heating capacity of the vapor compression system 20 changes as operating conditions change, the heating load of the vapor compression system 20 does not change as operating conditions change.

FIG. 1 illustrates a first embodiment of the vapor compression system 20 including a single speed water pump 34. The vapor compression system 20 includes an auxiliary electric heater 58 that further heats the heated water 38 exiting the gas cooler 24 to increase the heating capacity of the vapor compression system 20. The auxiliary electric heater 58 can be located anywhere on the water line exiting the gas cooler 24. By employing an auxiliary electric heater 58, the vapor compression system 20 can be designed smaller to reduce manufacturing costs. The auxiliary electric heater 58 is activated to further heat the water exiting the heat sink outlet or supply 40 when the heating capacity of the vapor compression system 20 does not meet the demand.

In one example, a temperature sensor 60 detects the temperature of the water exiting the heat sink outlet or supply 40. When the temperature sensor 60 detects the temperature of the water 38 exiting the heat sink outlet or supply 40 is below a threshold value, a control 62 activates the auxiliary electric heater 58 to further heat the water 38 exiting the gas cooler 24. When the temperature sensor 60 detects that the temperature of the water 38 exiting the heat sink outlet or supply 40 is above the threshold value, the control 62 deactivates the auxiliary electric heater. In one example, the threshold value is 140° F. However, it is to be understood that the threshold value can be any desired temperature, and one skilled in the art who has the benefit of this description would know what the threshold temperature would be.

The auxiliary electric heater 58 is only activated when the system 20 is in operation and when the temperature sensor 60 detects that the temperature of the water 38 exiting the heat sink outlet or supply 40 is below the threshold value. That is, when the compressor 22 is inactive, the auxiliary electric heater 58 is inactive.

In another example, an ambient temperature sensor 82 determines the temperature of the outdoor air 44. When the ambient temperature sensor 82 detects the temperature of the outdoor air 44 is below a threshold value and the compressor 22 is operating, the control 62 activates the auxiliary electric heater 58 to further heat the water 38 exiting the gas cooler 24. When the ambient temperature sensor 82 detects that the temperature of the outdoor air 44 is above the threshold value, the control 62 deactivates the auxiliary electric heater.

The auxiliary electric heater 58 is only activated when the system 20 is in operation and when the ambient temperature sensor 82 detects the temperature of the outdoor air 44 is below the threshold value. That is, when the compressor 22 is inactive, the auxiliary electric heater 58 is inactive.

The vapor compression system 20 can also include a variable speed water pump 34. The ambient temperature sensor 82 detects the temperature of the outdoor air 44. When the ambient temperature sensor 82 detects the temperature of the outdoor air 44 is below a first threshold value, the control 62 increases the speed of the water pump 34 to lower the temperature of the water exiting the heat sink outlet or supply 40 to a value slightly below the desired customer temperature. The control 62 activates the auxiliary electric heater 58 to further heat the water 38 exiting the gas cooler 24 to raise the temperature of the water exiting the heat sink outlet or supply 40 to the desired customer temperature. When the ambient temperature sensor 82 detects the outdoor air 44 temperature is above a second threshold value, the control 62 deactivates the auxiliary electric heater 58.

For example, if the customer desired temperature is 140° F., the control 62 increases the speed of the water pump 24 to lower the temperature of the water exiting the heat sink outlet or supply 40 to 120° F. The control 62 activates the auxiliary electric heater 58 to further heat the water 38 exiting the gas cooler 24 to raise the temperature of the water exiting the heat sink outlet or supply 40 to 140° F.

Although only one auxiliary electric heater 58 is illustrated and described, it is to be understood that multiple auxiliary electric heaters 58 can be employed to further heat the water 38 exiting the gas cooler 24.

Figure 2:
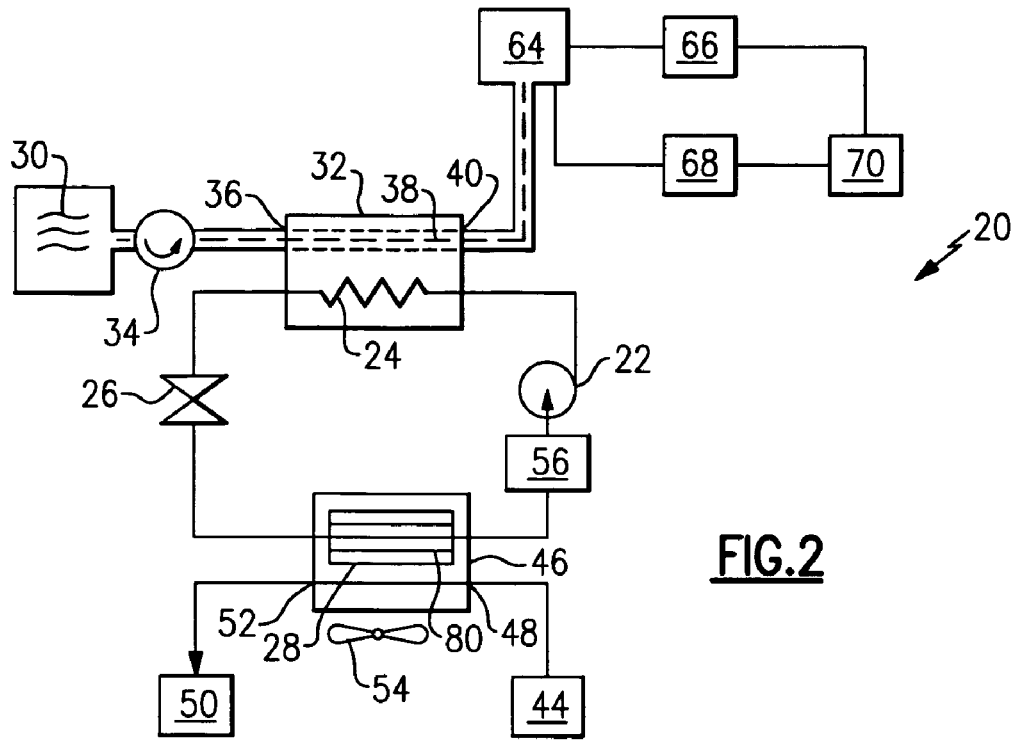
FIG. 2 schematically illustrates a diagram of a second embodiment of a vapor compression system employing an auxiliary electric heater.

Alternately, as shown in FIG. 2, an auxiliary electric heater 66 is installed in the water tank 64 that stores the heated water 38. The auxiliary electric heater 66 can further heat the water 38 in the water tank 64 with or without starting and operating the vapor compression system 20. If the vapor compression system 20 cannot be operated due to a component malfunction, the auxiliary electric heater 66 can temporarily heat the water 38 in the water tank 64. The auxiliary electric heater 66 also compensates for any standby heat losses that may occur through the water tank 64 when the vapor compression system 20 is not operating, reducing the startup and shutdown times of the compressor 22.

A temperature sensor 68 in the water tank 64 detects the temperature of the water in the water tank 64. When the temperature sensor 68 detects the temperature of the water in the water tank 64 is below a first threshold value, a control 70 activates the auxiliary electric heater 66 to heat the water in the water tank 64. When the temperature sensor 68 detects that the temperature of the water in the water tank 64 is above a second threshold value, a control 70 deactivates the auxiliary electric heater 66.

Figure 3:
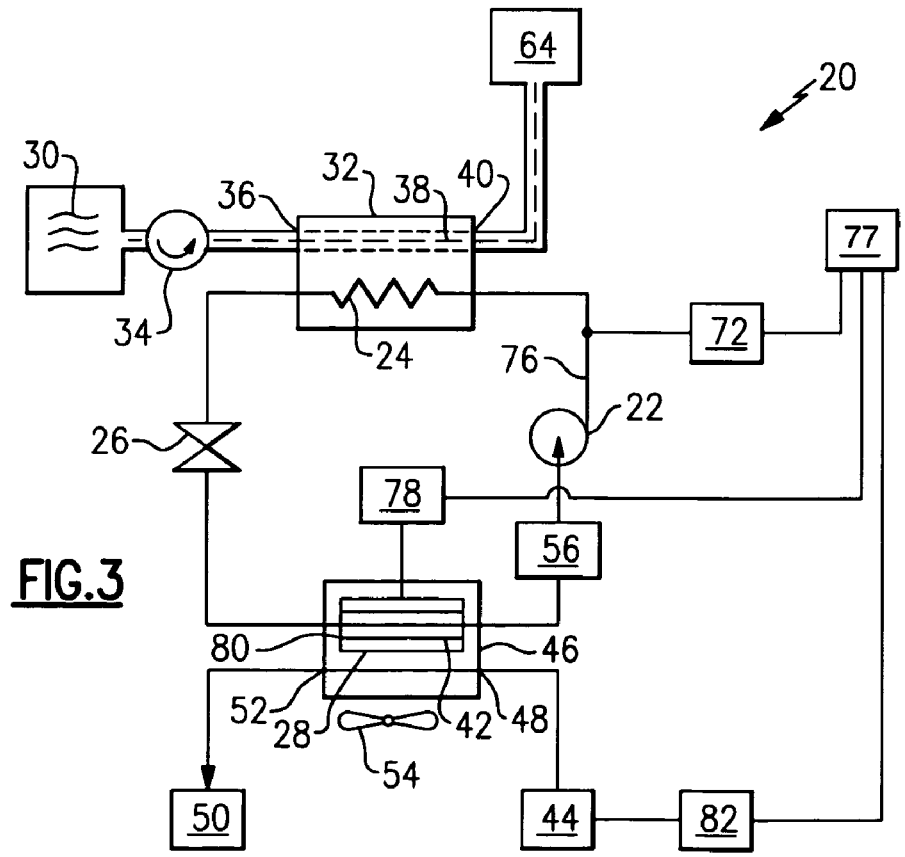
FIG. 3 schematically illustrates a diagram of a third embodiment of a vapor compression system employing an auxiliary electric heater.

Alternately, as shown in FIG. 3, an auxiliary electric heater 72 is installed near the compressor discharge 76 of the compressor 22. The auxiliary electric heater 72 is only activated when the system 20 is in operation. When the auxiliary electric heater 72 is activated, the refrigerant exiting the compressor 22 is further heated, increasing the temperature of the refrigerant entering the gas cooler 24. The heat generated by the auxiliary electric heater 72 is transferred to the water flowing through the gas cooler 24 via the refrigerant flowing through the gas cooler 24, increasing the amount of heat transferred to the water flowing through the gas cooler 24.

An ambient temperature sensor 82 detects the temperature of the outdoor air 44. When the ambient temperature sensor 82 detects the temperature of the outdoor air 44 is below a threshold value, a control 77 activates the auxiliary electric heater 72 to additionally heat the water 38 exiting the heat sink 32. When the ambient temperature sensor 82 detects that the outdoor air 44 temperature is above the threshold value, the control 77 deactivates the auxiliary electric heater 72 to stop heating the water 38 exiting the gas cooler 24. In one example, the threshold temperature is 32° F.

The auxiliary electric heater 72 is only activated when the system 20 is in operation and when the ambient temperature sensor 82 detects the temperature of the outdoor air 44 is below the threshold value. That is, when the compressor 22 is inactive, the auxiliary electric heater 72 is inactive.

The auxiliary electric heater 72 can also be activated to decrease the time of the defrost cycle. When the surface temperature of the evaporator 28 is below the dew-point temperature of the moist outdoor air, water droplets condense onto the evaporator fins 42. When the surface temperature of the evaporator 28 is below freezing, the water droplets can freeze on the evaporator 28. Frost crystals grow from the frozen droplets and block the passage of air across the evaporator fins 42. The blockage increases the pressure drop through the evaporator 28, reducing the airflow through the evaporator 28, degrading heat pump performance, and reducing heating capacity.

A defrost cycle is initiated to defrost the evaporator 28 when a defrost sensor 78 detects a condition that necessitates defrosting. In one example, defrosting is needed when frost accumulates on a coil of the evaporator 28.

During a defrost cycle, hot refrigerant flows through the evaporator 28 to melt the frost crystals on the evaporator 28. The evaporator 28 can be defrosted by converting the compressor 22 power input into heat that is transferred to the evaporator 28 by the refrigerant. The evaporator 28 can also be defrosted by deactivating the water pump 34 in the gas cooler 24. The hot refrigerant from the compressor 22 flows through the gas cooler 24 without rejecting heat to the water 30 flowing through the gas cooler 24. The hot refrigerant is expanded in the expansion device 26 and flows through the evaporator 28 to defrost the evaporator 28.

The coefficient of performance of a defrost cycle is always less than one due to heat losses. Therefore, the refrigerant mass flow rate and the compressor 22 power draw are always very low, increasing defrost cycle times and decrease the heating capacity of the vapor compression system 20.

The auxiliary electric heater 72 can be operated to reduce the defrost cycle time. When the frost sensor 78 detects a condition that necessitates defrosting, the control 77 turns on the auxiliary electric heater 72 to further heat the refrigerant exiting the compressor discharge 76. The heated refrigerant flows through the evaporator 28 during the defrost cycle to melt any frost, decreasing the defrost cycle time. When the defrost sensor 78 detects that defrosting is no longer necessary, the control 77 turns off the auxiliary electric heater 72, allowing the system 20 to return to normal operation.

The auxiliary electric heaters 58, 66 and 72 are activated at low ambient conditions when the refrigerant mass flow and compressor 22 power draw are low, such as in the winter. Therefore, the total electric capacity required by the vapor compression system 20 will not increase. By increasing the heating capacity of the vapor compression system 20 at low outdoor air temperatures, the system 20 can be designed smaller, decreasing the manufacturing cost. That is, one or more of any of the auxiliary electric heaters 58, 66 and 72 can be employed without any appreciable cost increase for the overall system.

It is to be understood that the vapor compression system 20 can include any combination of the auxiliary electric heater 58 that directly heats the hot water 38 exiting the gas cooler 24, the auxiliary electric heater 66 that heats the water in the water tank 64 and the auxiliary electric heater 72 that directly heats the refrigerant exiting the compressor 22 as described above.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vapor compression system comprising:
    a compression device to compress a refrigerant to a high pressure;

a heat rejecting heat exchanger for cooling the refrigerant, wherein water absorbs heat from the refrigerant flowing through said heat rejecting heat exchanger;

an expansion device for reducing the refrigerant to a low pressure;

a heat accepting heat exchanger for evaporating the refrigerant; and an auxiliary heater that selectively heats at least one of the refrigerant and the water, wherein said auxiliary heater is only active when the vapor compression system is in operation.

2. A vapor compression system comprising:

a compression device to compress a refrigerant to a high pressure, wherein said compression device includes a compressor discharge;

a heat rejecting heat exchanger for cooling the refrigerant, wherein water absorbs heat from the refrigerant flowing through said heat rejecting heat exchanger;

an expansion device for reducing the refrigerant to a low pressure;

a heat accepting heat exchanger for evaporating the refrigerant; and an auxiliary heater that selectively heats at least one of the refrigerant and the water, wherein said auxiliary heater heats the refrigerant that exits said compressor through said compressor discharge before the refrigerant enters said heat rejecting heat exchanger.

3. The vapor compression system as recited in claim 2 including an ambient temperature sensor that detects a temperature of outdoor air.

4. The vapor compression system as recited in claim 3 further including a control, wherein said control activates said auxiliary heater when said ambient temperature sensor detects that said temperature of said outdoor air is below a threshold value.

5. The vapor compression system as recited in claim 2 wherein said auxiliary heater is an electric heater.

6. The vapor compression system as recited in claim 2 wherein the refrigerant is carbon dioxide.

7. The vapor compression system as recited in claim 2 wherein the refrigerant that is selectively heated transfers heat to the water when the refrigerant flows through the heat rejecting heat exchanger.

8. A vapor compression system comprising:

a compression device to compress a refrigerant to a high pressure, wherein said compression device includes a compressor discharge;

a heat rejecting heat exchanger for cooling the refrigerant;

an expansion device for reducing the refrigerant to a low pressure;

a heat accepting heat exchanger for evaporating the refrigerant;

an auxiliary heater that selectively heats the refrigerant, wherein said auxiliary heater heats said refrigerant that exits said compression device through said compressor discharge;

an ambient temperature sensor that detects a temperature of outdoor air;

a control that activates said auxiliary heater when said ambient temperature sensor detects that said temperature of said outdoor air is below a threshold value; and a defrost sensor that detects a defrosting condition of said heat accepting heat exchanger, wherein said control activates said auxiliary heater when said defrost sensor detects said defrosting condition.

9. A method of increasing heating capacity of a transcritical vapor compression system including an auxiliary heater, the method comprising the steps of:

compressing a refrigerant to a high pressure with a compression device;

rejecting heat from the refrigerant into water;

expanding the refrigerant to a low pressure;

evaporating the refrigerant; and activating the auxiliary heater to selectively further heat at least one of the water and the refrigerant with the auxiliary heater, wherein the step of activating the auxiliary heater includes activating the auxiliary heater when the vapor compression system is active.

10. A method of increasing heating capacity of a transcritical vapor compression system including an auxiliary heater, the method comprising the steps of:

compressing a refrigerant to a high pressure with a compression device;

rejecting heat from the refrigerant into water;

expanding the refrigerant to a low pressure;

evaporating the refrigerant; and activating the auxiliary heater to selectively further heat at least one of the water and the refrigerant with the auxiliary heater by directly heating the refrigerant after the step of compressing and before the step of rejecting heat.

11. The method as recited in claim 10 further including the step of transferring heat from the refrigerant that is selectively heated to the water during the step rejecting heat from the refrigerant to the water.

12. A method of increasing heating capacity of a transcritical vapor compression system including an auxiliary heater, the method comprising the steps of:

compressing a refrigerant to a high pressure with a compression device;

rejecting heat from the refrigerant into water;

expanding the refrigerant to a low pressure;

evaporating the refrigerant;

activating the auxiliary heater to selectively further heat at least one of the water and the refrigerant with the auxiliary heater; and detecting a temperature of outdoor air, wherein the step of activating said auxiliary heater includes activating said auxiliary heater when said temperature is below a threshold value.

13. A vapor compression system comprising:

a compression device to compress a refrigerant to a high pressure;

a heat rejecting heat exchanger for cooling the refrigerant, wherein water absorbs heat from the refrigerant flowing through said heat rejecting heat exchanger;

an expansion device for reducing the refrigerant to a low pressure;

a heat accepting heat exchanger for evaporating the refrigerant; and an auxiliary heater that selectively heats at least one of the refrigerant and the water, wherein said auxiliary heater is inactive when said compression device is inactive.

14. A method of increasing heating capacity of a transcritical vapor compression system including an auxiliary heater, the method comprising the steps of:

compressing a refrigerant to a high pressure with a compression device;

rejecting heat from the refrigerant into water;

expanding the refrigerant to a low pressure;

evaporating the refrigerant;

activating the auxiliary heater to selectively further heat at least one of the water and the refrigerant with the auxiliary heater; and inactivating the auxiliary heater occurs when the compression device is inactive.

* * * * *